(12) United States Patent
Kelch et al.

(10) Patent No.: US 12,037,288 B2
(45) Date of Patent: Jul. 16, 2024

(54) POLYURETHANE-BASED POLYMER CONCRETES AND GROUTING MORTARS

(71) Applicant: SIKA TECHNOLOGY AG, Baar (CH)

(72) Inventors: Steffen Kelch, Oberengstringen (CH); Tim Mamie, Zürich (CH); Rui Xu-Rabl, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 333 days.

(21) Appl. No.: 17/604,867

(22) PCT Filed: May 28, 2020

(86) PCT No.: PCT/EP2020/064824
§ 371 (c)(1),
(2) Date: Oct. 19, 2021

(87) PCT Pub. No.: WO2020/239902
PCT Pub. Date: Dec. 3, 2020

(65) Prior Publication Data
US 2022/0220032 A1 Jul. 14, 2022

(30) Foreign Application Priority Data
May 28, 2019 (EP) .................................... 19177000

(51) Int. Cl.
*C04B 26/16* (2006.01)
*C04B 14/06* (2006.01)
(Continued)

(52) U.S. Cl.
CPC .............. *C04B 26/16* (2013.01); *C04B 14/06* (2013.01); *C04B 14/28* (2013.01); *C04B 18/142* (2013.01);
(Continued)

(58) Field of Classification Search
CPC ......... C04B 26/16; C04B 14/06; C04B 14/28; C04B 18/142; C04B 20/1003;
(Continued)

(56) References Cited

U.S. PATENT DOCUMENTS 5,648,421 A * 7/1997 Thiele .................. E01C 11/225
524/789
9,464,003 B2 * 10/2016 Hicks ...................... E01C 19/50
(Continued)

FOREIGN PATENT DOCUMENTS

EP     3 339 343 A1    6/2018
EP     3 415 544 A1   12/2018
(Continued)

OTHER PUBLICATIONS

Simon Blott and Kenneth Pye, "Particle shape: a review and new methods of characterization and classification", Sedimentology, vol. 55, Issue 1, pp. 31-63, Oct. 1, 2007.
(Continued)

*Primary Examiner* — Mark Kopec
*Assistant Examiner* — Jaison P Thomas
(74) *Attorney, Agent, or Firm* — Oliff PLC (57) ABSTRACT

The present invention relates to a curable binder composition comprising: a) at least one organic binder comprising a polyisocyanate and a polyol, and b) at least 50% by weight of a filler in the form of quartz and/or slag, based on 100% by weight of binder composition.

15 Claims, 2 Drawing Sheets

(51) Int. Cl.
*C04B 14/28* (2006.01)
*C04B 18/14* (2006.01)
*C04B 20/10* (2006.01)
*C04B 28/08* (2006.01)
C04B 103/30 (2006.01)
C04B 103/40 (2006.01)
C04B 111/00 (2006.01)
C04B 111/60 (2006.01)
C04B 111/70 (2006.01)
C04B 111/94 (2006.01)

(52) U.S. Cl.
CPC ........ *C04B 20/1003* (2013.01); *C04B 28/082* (2013.01); *C04B 2103/30* (2013.01); *C04B 2103/408* (2013.01); *C04B 2111/00482* (2013.01); *C04B 2111/00637* (2013.01); *C04B 2111/00689* (2013.01); *C04B 2111/60* (2013.01); *C04B 2111/70* (2013.01); *C04B 2111/94* (2013.01)

(58) Field of Classification Search
CPC .............. C04B 28/082; C04B 2103/30; C04B 2103/408; C04B 2111/00482; C04B 2111/00637; C04B 2111/00689; C04B 2111/60; C04B 2111/70; C04B 2111/94; C04B 2111/00663; C04B 2111/00715; C04B 2111/2023; C04B 2111/23; C04B 28/08; Y02W 30/91
See application file for complete search history.

(56) References Cited

U.S. PATENT DOCUMENTS

2009/0149574 A1* 6/2009 Sanchez ................. C04B 28/02
524/2
2023/0339813 A1* 10/2023 Kelch ................... C04B 40/065

FOREIGN PATENT DOCUMENTS

| | | |
|---|---|---|
| GB | 2460707 A | 12/2009 |
| JP | H09-30854 A | 2/1997 |
| KR | 10-2011-0119899 A | 11/2011 |
| KR | 10-1705893 B1 | 2/2017 |
| WO | 2010/030048 A1 | 3/2010 |
| WO | 2013/120719 A1 | 8/2013 |

OTHER PUBLICATIONS

Nov. 16, 2021 International Preliminary Report on Patentability issued in International Patent Application No. PCT/EP2020/064824.

Aug. 17, 2020 Search Report issued in International Patent Applciation No. PCT/EP2020/064824.

* cited by examiner

POLYURETHANE-BASED POLYMER CONCRETES AND GROUTING MORTARS

TECHNICAL FIELD

The invention relates to a curable binder composition comprising: a) at least one organic binder and b) a filler. The invention further relates to a multicomponent system for producing a curable binder composition and also to various uses of the binder composition and of the multicomponent system. The invention also provides a cured binder composition or a cured multicomponent system.

STATE OF THE ART

Polymer concrete is a material impermeable to water that typically comprises an organic binder and fillers. Unlike normal concrete, in which the cement as binder holds the fillers together after hardening with water, in polymer concrete it is an organic polymer that acts as binder. Polymer concrete typically does not contain any cement as a binder. The filler in polymer concrete typically consists of natural rock, for example granite, quartz, basalt, limestone, expanded clay, perlite or other mineral raw materials, in varying grain sizes. Fillers are employed to alter the mechanical, electrical and/or processing properties of materials and at the same time to considerably reduce the proportion of the typically more costly matrix in the finished product. In addition, the presence of the filler grains ensures that the shrinkage in volume of the polymer concrete after curing of reactively crosslinking polymer matrices is significantly reduced and that the compressive strength thereof is assured.

The curable liquid organic binder, typically consisting of at least two components, is normally mixed with the filler after the binder components have been mixed, and then shaped and allowed to cure.

Examples of known organic binders are epoxy resin-based systems, polyurethane-based systems, unsaturated polyester resins or acrylic resins.

In epoxy-resin-based polymer concrete, the curable binder consists of a curable epoxy resin and a curing agent for the epoxy resin, which react after mixing to form a cured epoxy resin. In polyurethane-based polymer concrete, the curable binder consists of a polyisocyanate and a polyol, which react after mixing to form a chemically crosslinked polyurethane.

Polymer concretes based on epoxy resins or polyurethanes are characterized by high strength, frost resistance, abrasion resistance, and material resistance, and also by a closed and waterproof surface. However, known polymer concretes based on epoxy resins or polyurethanes exhibit only limited stability under corrosive conditions.

The growing demand for building materials, as well as environmental protection requirements, result in a shortage of natural mineral raw materials capable of being used as fillers. This is true in particular of quartz sand and quartz gravel. There are therefore efforts increasingly to replace natural raw materials with industrial waste materials.

GB 2460707 describes the use of recycled material as aggregate for polymer concrete. Glass sand, plastic beads, crushed porcelain or recycled polymer concrete are used as partial substitutes for natural rocks.

An industrial waste material that occurs in large amounts around the world is slag. It occurs for example in the extraction of metals, in metal recycling or in the incineration of household waste or sewage sludge. Foundry sand, a glassy slag from iron production, on account of its latent hydraulic properties, is used in finely ground form as an additive in cement and as a cement substitute. Other slags, such as steel slag formed in steel production or steel recycling, or copper slag that occurs in copper production, are less suitable as a cement substitute because of their poor hydraulic properties. Like blast furnace slag, they are sometimes used as gravel in road construction, as inexpensive backfill material or, in the case for example of copper slag, as abrasives.

WO 2010 030048 describes the use of "atomized steel slag" as a constituent of polymer concrete based on an unsaturated polyester resin. This "atomized steel slag" is produced by a special process that gives rise to additional costs, making the slag more costly. Atomized steel slag has only limited availability in terms of both amount and location.

Conventional fillers such as quartz sand cannot readily be replaced by industrial waste materials in known polymer concretes. Depending on the nature of the industrial waste materials, partial or complete replacement can result in undesirable changes in the physical and chemical properties of polymer concretes. There is accordingly still a need for new approaches and improved solutions in the field of polymer concretes in which the abovementioned disadvantages are as far as possible absent.

SUMMARY OF THE INVENTION

It is an object of the present invention to provide improved polymer concretes and polymer-based grouting mortars. In particular, the polymer concretes and grouting mortars should have mechanical and chemical properties that are as advantageous as possible. The polymer concretes or grouting mortars should be as stable as possible to corrosive conditions. Also desirable is the ability to use, for the production of polymer concretes or grouting mortars, both conventional fillers and industrial waste materials which are as far as possible available globally and do not require any laborious processing.

This object is surprisingly achieved by a binder composition as described in claim 1.

Binder compositions based on polyisocyanate and polyol have the advantage over other organic binder compositions that are also used for polymer concrete, in particular over unsaturated polyester resins or acrylic resins, of being readily processable and curable even at low temperatures such as 5° C. or 10° C., as well as having good casting and leveling properties. Also, unlike the often highly viscous unsaturated polyester resins, curing does not necessitate the use of initiators that are an explosion hazard, such as peroxides. In addition, the surface of the cured polyurethane-based binder composition is firm and nontacky, in contrast to unsaturated polyester resins, in which the surface often hardens only slowly or incompletely.

Compared to epoxy-based compositions having the same concentration by weight of fillers, the inventive polyurethane-based compositions and polymer concretes or grouting mortars obtainable therefrom typically have slightly lower/reduced compressive and flexural strength on account of the flexibility of the polyurethane matrix after curing (7 d at room temperature). However, compared to the epoxy-based reference material the polyurethane-based compositions of the invention have much less pronounced swellability in water and significantly higher chemical and mechanical stability to the action of corrosive media, in particular to dilute organic acids such as aqueous acetic acid.

Specifically, it has been shown that—even if in permanent contact either with acidic aqueous solutions (pH<7) or with neutral aqueous solutions (pH=7) and basic aqueous solutions (pH>7)—the compressive strengths of polyurethane-based polymer concretes and grouting mortars remain essentially stable for weeks or even cure further.

This contrasts with epoxy resin-based compositions produced for test purposes, which likewise cure further to some degree on contact with basic aqueous solutions but show a sharp fall in compressive strength over time in contact with acidic or neutral aqueous solutions.

Polyurethane-based compositions therefore exhibit high stability to corrosion irrespective of the pH of corrosive media. This is a major advantage, because polymer concretes or grouting mortars typically come into contact with both alkaline and acidic solutions. This is the case for example when polyurethane-based polymer concretes or grouting mortars are used in combination with cementitious materials from which alkaline substances can be leached out or when polymer concretes or grouting mortars come into contact with acidic cleaning agents from time to time.

The recited advantages of polyurethane-based compositions can be realized both with conventional fillers, for example quartz, and with industrial waste materials, in particular slags, which are inexpensive and available globally. Slags are however particularly advantageous in their chemical stability and compressive strength, which means that quartz can be dispensed altogether if necessary.

It is surprisingly possible to use slag as filler in high proportions in polyurethane-based compositions without loss of quality.

Slag is a waste material from metal extraction, metal recycling or waste incineration and occurs in very large amounts worldwide. Its use in the polyurethane-based compositions of the invention helps reduce landfill waste and reduces the need for high-quality natural aggregates, the availability of which is progressively diminishing.

Polyurethane-based polymer concretes and grouting mortars that contain slag show good properties such as in particular high strength and good processability, even when the polymer concretes and grouting mortars are completely free of customary fillers such as in particular quartz sand or quartz powder. The material properties, in particular the compressive strength, are surprisingly sometimes even improved compared to the prior art.

A particular surprise is that the polymer concretes and grouting mortars of the invention have improved electrical conductivity, particularly when they contain steel slag or copper slag. In addition, the thermal conductivity can sometimes be affected, in particular reduced.

Further aspects of the invention are the subject of further independent claims. Particularly preferred embodiments of the invention are the subject of the dependent claims.

Ways of Executing the Invention

The invention provides a curable binder composition comprising: a) at least one organic binder comprising a polyisocyanate and a polyol, and b) at least 50% by weight of a filler in the form of quartz and/or slag, based on 100% by weight of the binder composition.

In the present document, "bulk density" is understood as meaning the density of a solid body. The bulk density is the ratio of the weight of the solid body to its volume, including the enclosed pore volume.

Curable organic binder compositions that give rise to a polyurethane after curing comprise reactively crosslinkable polyisocyanates having more than one isocyanate group per molecule, which react with polyols to afford a solid material via the formation of covalent bonds.

The curable binder composition of the invention is curable since the isocyanate groups are still unreacted or have reacted only in part.

A "filler" is understood as meaning a particulate substance. In the context of the present invention, this takes the form of quartz, slag or a mixture of slag and quartz. Quartz and slag are commercially available in different shapes and sizes. The shapes can vary from fine sand particles to large, coarse stones.

Particularly preferably, the filler is in the form of slag or a mixture of slag and quartz. Very particularly preferably, the filler is in the form of slag.

The filler, in particular slag, preferably has a grain size/particle size of 0.1 µm to 32 mm, in particular 0.05 to 10 mm. Particularly preferably, the filler has a particle size of at least 0.1 mm, especially of 0.1-3.5 mm, very particularly preferably of more than 0.1 mm to 3.5 mm. The grain size/particle size can be determined by a sieving method in accordance with DIN EN 933-1.

More preferably, there are at least two, in particular at least three, grain fractions having different particle sizes in the filler. The at least two or three different grain fractions may consist of the same material or of different materials.

The filler, in particular slag, particularly preferably includes at least three different grain fractions. In particular, a first grain fraction has a particle size within a range of 0.125-0.25 mm, a second grain fraction has a particle size within a range of 0.5-0.8 mm, and a third grain fraction has a particle size within a range of 2.0-3.15 mm.

In particular, the filler, in particular slag, has a proportion of at least 60% by weight, preferably at least 65% by weight, based on 100% by weight of the binder composition.

The binder composition advantageously comprises 50% to 80% by weight, in particular 60% to 75% by weight, especially 65% to 70% by weight, of filler, based on 100% by weight of the binder composition. The filler is particularly preferably slag.

However, it can also be advantageous, especially for high strengths and/or good electrical conductivity, when the binder composition comprises 83% to 90% by weight, preferably 85% to 88% by weight, of filler, based on 100% by weight of the binder composition. In this case, the filler is likewise preferably slag.

In addition to the at least 50% by weight of filler, in particular slag, the binder composition preferably also comprises at least one additional filler material.

The additional filler material differs from the filler, in particular chemically and/or in respect of particle size. Chemically different means that the filler has an empirical formula different to that of the filler material.

A proportion of the additional filler material is preferably 10% to 40% by weight, in particular 15% to 35% by weight, especially 20% to 30% by weight, these values being based on 100% by weight of the binder composition.

The particle size of the additional filler material is guided by the individual use and can be up to 32 mm or more. The particle size is preferably not more than 16 mm, especially preferably not more than 8 mm. The particle size is particularly preferably less than 4 mm. A particle size within a range from approximately 0.1 µm to 3.5 mm is advantageous. The grain size/particle size can be determined by a sieving method in accordance with DIN EN 933-1.

In particular, the additional filler material has a particle size of not more than 0.1 mm, preferably within a range from 0.1 μm to not more than 1 mm.

It is advantageous to mix filler materials of different particle size in accordance with the desired grading curve.

In an advantageous embodiment, the binder composition comprises filler in the form of slag and/or quartz having a particle size of more than 0.1 mm and additional filler material having a particle size of not more than 0.1 mm and no further filler material. In this case, the additional filler material is preferably selected from sand, gravel, crushed stones, calcined pebbles, clay minerals, pumice stone, perlite, limestone, limestone powder, quartz powder, silica dust, chalk, titanium dioxide, baryte and/or alumina. Mixtures of two or more of the listed representatives may also be present here.

In particular, the additional filler material is selected from the group consisting of sand, gravel, crushed stones, calcined silica, clay minerals, pumice stone, perlite, limestone, limestone powder, chalk, titanium dioxide, baryte and/or alumina. Mixtures of two or more of the listed representatives may also be present here. Particular preference is given to limestone and/or baryte.

The binder composition advantageously comprises 50% to 80% by weight, in particular 60% to 75% by weight, especially 65% to 70% by weight, of slag and/or quartz, and also 10% to 40% by weight, in particular 15% to 35% by weight, especially 20% to 30% by weight, of the additional filler material, these values being based on 100% by weight of the binder composition. The additional filler material includes in particular limestone and/or baryte.

The binder composition very particularly preferably comprises 50% to 80% by weight, in particular 60% to 75% by weight, especially 65% to 70% by weight, of slag, and also 10% to 40% by weight, in particular 15% to 35% by weight, especially 20% to 30% by weight, of the additional filler material, in particular limestone and/or baryte, these values being based on 100% by weight of the binder composition.

The binder composition preferably comprises filler in the form of slag and/or quartz having a particle size of more than 0.1 mm and additional filler material that is not a slag and/or quartz and has a particle size of not more than 0.1 mm and no further filler material. Such compositions are easy to process and provide good strength after curing. The grain size/particle size can be determined by a sieving method in accordance with DIN EN 933-1.

The binder composition even more preferably comprises slag having a particle size greater than 0.1 mm and additional filler material that is not a slag and has a particle size of not more than 0.1 mm and no further filler materials. Such compositions are easy to process and provide good strength after curing.

A proportion by weight of the additional filler material in the total weight of the binder composition is preferably smaller than a proportion by weight of the filler.

Preferably, the mass ratio of filler, in particular slag, to the additional filler material, in particular having a particle size of not more than 0.1 mm, is from 100:0 to 60:40, in particular from 80:20 to 70:30. Such a ratio achieves good packing of the mineral fillers and good strength in the cured binder composition. It is advantageous when the filler, in particular the slag, in this case has a particle size greater than 0.1 mm.

However, it can also be advantageous when the binder composition contains no additional filler material. The slag and/or quartz in this case comprises all mineral particles having a size of approximately 0.1 μm up to 1 mm, 2 mm, 4 mm, 8 mm, or more.

It is particularly preferable when the binder composition comprises exclusively slag as filler and no additional filler material. In this case there is no quartz present either. The slag in this case comprises all mineral particles having a size of approximately 0.1 μm up to 1 mm, 2 mm, 4 mm, 8 mm, or more. This is particularly advantageous for maximum utilization of the slag and for good strength in the cured binder composition and also, particularly in the case of iron-containing slags, for improved electrical conductivity. In addition, the thermal conductivity can sometimes also be affected.

Slag arises as a by-product of the extraction of metals in ore smelting, metal recycling or waste incineration. It is a mixture of substances that is mainly composed of oxides and silicates of various metals. The chemical composition of slags is typically stated as the oxides, irrespective of the compounds in which the elements are actually present. For example, the content of Si is stated as $SiO_2$, the content of Al as $Al_2O_3$, and the content of Fe as FeO. Thus, an analytically determined amount of 10 g of iron (Fe) corresponds for example to an amount of 12.9 g of FeO. The stated percentage for constituents in a composition of slags refers here to the percentage of the constituent as its oxide, based on the sum of all constituents in the composition, the weight of which is likewise calculated in the form of its oxides. The main constituents of slags are CaO, $SiO_2$, $Al_2O_3$, MgO, and FeO. The proportion of these substances in different types of slag can vary greatly. The composition of the slag can be determined by X-ray fluorescence analysis in accordance with DIN EN ISO 12677.

Slag, in particular slag from metal extraction or metal recycling, is typically removed from the molten metal in the liquid state and stored to allow it to cool down, typically in slag beds. Cooling can be accelerated, for instance by spraying with water. The cooling process can influence the physical properties, in particular the crystallinity and the grain size of the slag.

Blast furnace slag (BFS) is slag that occurs during production of pig iron in a blast furnace. During the reduction process in the blast furnace, the slag forms from the other materials present alongside the iron ore and the added slag formers such as limestone or dolomite. The slag is separated from the pig iron and either allowed to cool slowly in slag beds, resulting in the formation of mainly crystalline blast furnace lump slag, or it is quickly cooled with water and/or air, resulting in the formation of glassy foundry sand (FS). Blast furnace slags typically have an iron content, calculated as FeO, of less than 3% by weight, based on the overall composition of the slag, and a bulk density of 2.1 to 2.8 kg/l.

Steel slag occurs as a by-product in steel production from pig iron or in steel recycling. Steelmaking employs a number of processes and steps that give rise to steel slag. Examples of steel slag are BOS, basic oxygen slag, which occurs as a by-product in steel production by the oxygen-blowing process, LD slag, which occurs in the Linz-Donawitz process, or EFS, electric furnace slag, also EAFS for electric arc furnace slag, which occurs during steel production or steel recycling using an electric arc furnace. Further examples of steel slag are slags that occur in other steel purification processes, such as slag from a ladle furnace (ladle slag). Steel slags typically have an iron content of about 5% to 45% by weight, calculated as FeO, based on the overall composition of the slag, and a bulk density of 3.0-3.7 kg/l.

Other processes that give rise to slags are for example metallurgical processes for the extraction of non-ferrous metals. These slags are known as metallurgical slags and often have a high iron content. One such metallurgical slag is copper slag, which occurs as a by-product of copper production. Copper slag typically has a high iron content, often of 40% by weight or more, calculated as FeO. Much of the iron in copper slags is typically in the form of iron silicate. Copper slags typically have a bulk density in the region of 3.7 kg/l.

Slags occurring in waste incineration plants or incineration plants for sewage sludge vary greatly in composition. An often characteristic feature thereof is a high iron content.

The slag is preferably selected from the group consisting of blast furnace slags, in particular blast furnace lump slags and foundry slags, steel slags, metallurgical slags, in particular copper slags, and slags from waste incineration, preference being given to blast furnace slags, steel slags, and metallurgical slags.

Blast furnace slags and steel slags are readily available worldwide and typically exhibit only slight variations in their chemical and mineralogical composition and physical properties from one batch to the next. Metallurgical slags, in particular copper slag, are characterized by high density and high strength.

In a preferred embodiment of the invention, the slag is an iron-containing slag comprising at least 8% by weight, in particular at least 10% by weight, preferably at least 15% by weight, especially at least 20% by weight or at least 25% by weight, of iron, calculated as FeO. In particular, the iron-containing slag comprises 10% to 70% by weight of iron, calculated as FeO.

It has surprisingly been found that the presence in the cured binder composition of slags having a high content of iron can increase the electrical conductivity and sometimes also reduce the thermal conductivity. They are therefore especially well suited for the production of materials having improved electrical conductivity and reduced thermal conductivity. More particularly, slags in binder compositions intended to have improved electrical conductivity after curing contain 10% to 70% by weight, preferably 15% to 60% by weight, of iron, calculated as FeO. The iron-containing slag is preferably a steel slag, in particular slag from an electric arc furnace, casting ladle, Linz-Donawitz process or oxygen blowing process, or copper slag.

In a further preferred embodiment, the slag has a bulk density of at least 2.9 kg/l, preferably at least 3.1 kg/l, in particular at least 3.3 kg/l, especially at least 3.5 kg/l.

It has been found that binder compositions containing slags that have a high bulk density can after curing have a layer of cured binder on the upper side (upper surface) in which the proportion of slag is significantly lower than in the rest of the cured binder composition. In particular, the proportion of slag having a particle size above 0.1 mm is in this layer less than 10% by weight, in particular less than 5% by weight. This results in particularly good adhesion to an overlying material, which is especially advantageous, for example, for anchoring machines and turbines by grouting.

The preferred particle size of the slag is guided by the individual use and can be up to 32 mm or more. The slag advantageously has a particle size of not more than 16 mm, preferably not more than 8 mm, more preferably not more than 4 mm, especially not more than 3.5 mm. The grain size/particle size can be determined by a sieving method in accordance with DIN EN 933-1.

Slag particles of suitable size can also be obtained by crushing and/or grinding larger slag particles.

The slag can be separated into grain size fractions, for example by sieving, after which the individual grain size fractions can be mixed in different amounts so as to obtain a desired grain-size distribution, the grading curve. Such methods are known to the person skilled in the art.

The slag advantageously has a particle size of 0.05 to 16 mm, preferably 0.06 to 8 mm, more preferably 0.1 to 4 mm, especially 0.12 to 3.5 mm.

The slag particles preferably are irregularly shaped and/or have a rough surface and in particular are nonspherical. This is advantageous in particular for interlinking the particles with one another and for a good bond with the binder.

Figure 1:
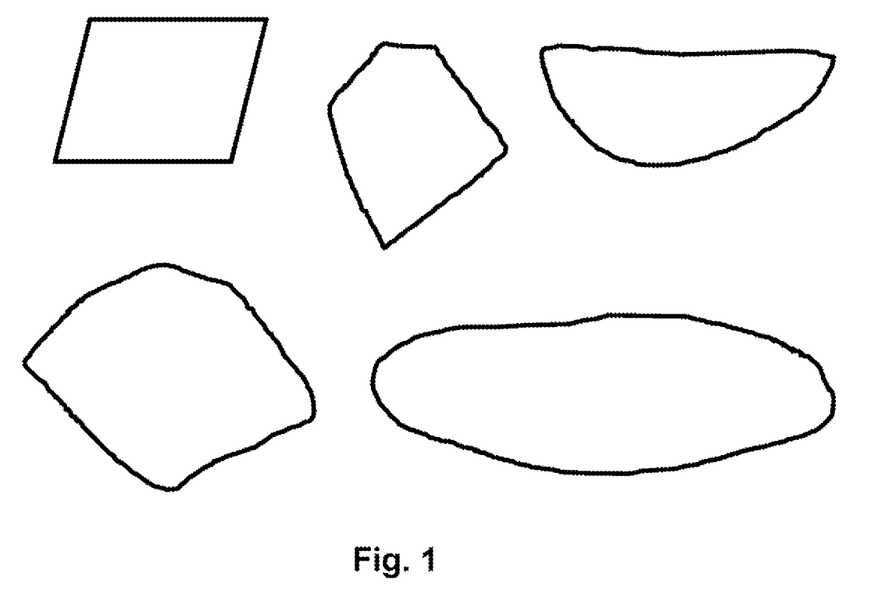
FIG. 1 shows: a schematic representation of exemplary cross sections of irregularly shaped slag particles.

In particular, the slag particles may—uniformly or non-uniformly—have any nonspherical geometric shape. For example, the particles may be conical, polygonal, cubic, pentagonal, hexagonal, octagonal, prismatic and/or polyhedral in shape. Non-uniform particles may for example have circular, elliptical, oval, square, rectangular, triangular or polygonal cross sections present at least partially therein. The terms "non-uniformly" or "irregularly" shaped particles refer to three-dimensional particle shapes in which at least two different cross sections through the particles have a different shape. Examples of cross sections through irregularly shaped slag particles are shown schematically in FIG. 1. An overview of suitable particle shapes is provided by S. Blott, K. Pye "Particle shape: a review and new methods of characterization and classification" in *Sedimentology* (2008) 55, 31-63.

Preference is given to a slag, in particular a steel slag, that has been cooled with water, particularly in slag beds. Also advantageous is a slag, in particular a copper slag, that has been granulated as a slag stream with a pressurized-water jet.

The more rapid cooling breaks the slag into small pieces. This is advantageous because it can save energy in comminution and also because it gives rise to irregular, often angular shapes.

The moisture content of the slag is preferably less than 5% by weight, more preferably less than 3% by weight, especially preferably less than 1')/0 by weight, in particular less than 0.5% by weight.

For certain uses it can be advantageous when the porosity of the slag is in the region of 5% by volume. This allows the weight of the product to be reduced without major adverse effect on the end properties.

For certain uses it can also be advantageous when the porosity of the slag is above 5% by volume, thereby allowing the weight of the product to be reduced. For certain uses, especially for highly pressure-resistant materials, it can also be advantageous when the porosity of the slag is less than 5% by volume, preferably less than 3% by volume.

In a particularly advantageous embodiment of the invention, the binder composition is preferably largely free of quartz, in particular quartz sand and quartz powder. In particular, it comprises less than 10% by weight, preferably less than 5% by weight, more preferably less than 1% by weight, of quartz. Such a composition conserves natural resources and enables good to very good processing properties, curing properties, and use properties.

The organic binder in the curable binder composition comprises at least one polyisocyanate and at least one polyol.

Polyisocyanate is understood as meaning a compound that contains two or more isocyanate groups. The term polyisocyanate here also encompasses polymers containing isocyanate groups. Polyisocyanates give rise to polyurethanes through a reaction with atmospheric moisture or with polyols. The term "polyurethane" here refers to polymers formed by what is known as diisocyanate polyaddition. In addition to the urethane groups, these polymers can also have other groups, in particular urea groups.

Preferred polyisocyanates are aliphatic, cycloaliphatic or aromatic diisocyanates, in particular hexamethylene 1,6-diisocyanate (HDI), 1-isocyanato-3,3,5-trimethyl-5-isocyanatomethylcyclohexane (isophorone diisocyanate or IPDI), perhydrodiphenylmethane 2,4′- and/or 4,4′- diisocyanate ($H_{12}$MDI), diphenylmethane 4,4′- diisocyanate, with or without fractions of diphenylmethane 2,4′- and/or 2,2′- diisocyanate (MDI), tolylene 2,4-diisocyanate or mixtures thereof with tolylene 2,6-diisocyanate (TDI), mixtures of MDI and MDI homologs (polymeric MDI or PMDI) or oligomeric isocyanates. A suitable polymer containing isocyanate groups is in particular obtained from the reaction of at least one polyol with a superstoichiometric amount of at least one polyisocyanate, in particular diisocyanate, preferably MDI, TDI, IPDI or HDI.

Suitable polyols are in particular the following commercially available polyols or mixtures thereof:
- polyether polyols, in particular polyoxyalkylene diols and/or polyoxyalkylene triols. Preferred polyether polyols are polyoxypropylene diols, polyoxypropylene triols or ethylene oxide-terminated (EO-endcapped) polyoxypropylene diols or -triols.
- polyester polyols, also called oligoesterols, prepared by known processes, in particular the polycondensation of hydroxycarboxylic acids or lactones or the polycondensation of aliphatic and/or aromatic polycarboxylic acids with di- or polyhydric alcohols. Particularly suitable polyester polyols are polyester diols.
- polycarbonate polyols as obtainable by reaction for example of the abovementioned alcohols—used to form the polyester polyols—with dialkyl carbonates, diaryl carbonates or phosgene.
- block copolymers bearing at least two hydroxyl groups and having at least two different blocks having polyether, polyester and/or polycarbonate structure of the type described above, in particular polyether polyester polyols.
- polyacrylate polyols and polymethacrylate polyols,
- polyhydroxy-functional fats and oils, also called fatty acid polyols,
- polyhydrocarbon polyols, also called oligohydrocarbonols,
- epoxidized vegetable oils and reaction products thereof with monofunctional alcohols,
- polybutadiene polyols,
- reaction products of vegetable oils, in particular castor oil, with ketone resins,
- polyester polyols based on hydrogenated tall oil,
- polyester polyols based on dimer fatty acids or dimer fatty alcohols,
- alkoxylated polyamines.

The organic binder preferably includes at least one mixture of polyols having different OH functionality.

The binder composition preferably comprises at least one aromatic polyisocyanate and at least one polyol selected from the group consisting of epoxidized vegetable oils and reaction products thereof with monofunctional alcohols, polybutadiene polyols, reaction products of vegetable oils, in particular castor oil, with ketone resins, polyester polyols based on hydrogenated tall oil, and polyester polyols based on dimer fatty acids or dimer fatty alcohols.

Especially advantageous are combinations of polyisocyanates and polyols as described in EP 3 339 343 and EP 3 415 544.

Such binder compositions are particularly hydrophobic, do not absorb moisture after curing, and are stable to hydrolysis, which is advantageous.

Suitable catalysts are metalorganic compounds or amines, in particular secondary and tertiary amines.

Preferably present in the binder composition is at least one wetting agent and/or dispersant, in particular one based on a polycarboxylate ether. This affords better processability, in particular good flowability, and a high proportion of fillers, which is advantageous for good homogeneity and strength in the cured binder composition.

In this document, polycarboxylate ether is understood as meaning a comb polymer in which anionic groups as well as polyalkylene glycol side chains are covalently attached to the polymer backbone. Such polymers are known as plasticizers for mineral binders such as cement and gypsum.

Preferred polycarboxylate ethers include structural units of the formula I and structural units of the formula II, where
$R^1$, in each case independently, is —COOM, —$SO_2$—OM, —O—PO(OM)$_2$ and/or —PO(OM)$_2$, preferably —COOM,
$R^2$ and $R^5$, in each case independently, are H, —$CH_2$—COOM or an alkyl group having 1 to 5 carbon atoms, preferably H or —$CH_3$,
$R^3$ and $R^6$, in each case independently, are H or an alkyl group having 1 to 5 carbon atoms, preferably H,
$R^4$ and $R^7$, in each case independently, are H, —COOM or an alkyl group having 1 to 5 carbon atoms, preferably H,
or where $R^1$ and $R^4$ form a ring to give —CO—O—CO— (anhydride),
M, in each case independently, is $H^+$, an alkali metal ion, an alkaline earth metal ion, a di- or trivalent metal ion, an ammonium group or an organic ammonium, preferably $H^+$ or an alkali metal ion,
p=0, 1 or 2,
o=0 or 1,
m=0, or an integer from 1 to 4,
n=2-250, in particular 10-200,
X, in each case independently, is —O— or —NH—,
$R^8$, in each case independently, is H, a $C_1$ to $C_{20}$ alkyl group, cyclohexyl group or alkylaryl group, and
A=$C_2$ to $C_4$ alkylene, preferably ethylene.

The molar ratio of structural unit I to structural unit II is preferably 0.7-10:1, more preferably 1-8:1, in particular 1.5-5:1.

It can also be advantageous when the polycarboxylate ether further comprises a structural unit III. Structural unit III is preferably derived from monomers selected from the group consisting of alkyl or hydroxyalkyl esters of acrylic or methacrylic acid, vinyl acetate, styrene and N-vinylpyrrolidone.

The polycarboxylate ether preferably contains carboxylic acid groups and/or salts thereof and polyethylene glycol side chains.

Preferably, the polycarboxylate ether is composed of structural units I derived from ethylenically unsaturated carboxylic acids, in particular unsaturated monocarboxylic acids, or salts thereof, and structural units II derived from ethylenically unsaturated polyalkylene glycols, in particular polyethylene glycols. In particular, the polycarboxylate ether does not contain any other structural units aside from structural units I and structural units II.

The filler, in particular slag, and optionally also the additional filler material, if present, are preferably coated with the wetting agent and/or dispersant. Coating can be accomplished by simply spraying either with a liquid wetting agent and/or dispersant or with a solution of a liquid or solid wetting agent and/or dispersant in a suitable solvent.

The polyisocyanate and the polyol preferably together have a proportion, based on 100% by weight of the binder composition, of at least 5% by weight, preferably at least 10% by weight, in particular 8% to 22% by weight, especially 10% to 15% by weight.

An advantageous binder composition comprises:
3% to 40% by weight of polyisocyanates,
3% to 40% by weight of polyols,
50% to 94% by weight of the filler, in particular slag, with preferably at least 20% by weight of the filler being iron-containing slag,
optionally 10% to 40% by weight, in particular 15% to 35% by weight, especially 20% to 30% by weight, of additional filler material, in particular limestone and/or baryte, and
0% to 15% by weight of further additives,
based on 100% by weight of the binder composition.

Preferably, the binder compositions of the invention prior to use take the form of a multicomponent system, in particular of a system having two or three components. The constituents capable of reacting with one another in a curing reaction are preferably present in containers stored separately from one another. In this form, the binder composition can be stored for a period of several months up to a year and longer without any alteration in its properties to an extent relevant to its use. Only when the binder composition is used are the reactive components of the organic binder mixed with one another, whereupon curing of the binder composition commences.

The invention further provides a multicomponent system for producing a curable binder composition, comprising at least one polyisocyanate component comprising at least one polyisocyanate, and at least one polyol component comprising at least one polyol, wherein slag and optionally further ingredients are present in the polyisocyanate component, in the polyol component and/or in a further component, a solid component.

The weight ratio of the polyisocyanate component to the polyol composition is preferably within a range from 2:1 to 1:3, more preferably from 1:1 to 1:2. The weight ratio of polyisocyanate component plus polyol component to the solid component is preferably 1:3 to 1:12, in particular 1:4 to 1:10.

The multicomponent system preferably comprises a solid component comprising the filler, particularly preferably slag. The solid component preferably comprises at least 60% by weight, preferably at least 70% by weight, especially at least 80% by weight or at least 90% by weight, advantageously even 100% by weight, of slag and/or quartz, in particular slag.

In addition to slag and/or quartz, the solid component preferably comprises the optional additional filler material, the optional wetting agent and/or dispersant, and optionally further additives.

A preferred composition of the solid component comprises:
70% to 90% by weight of slag and/or quartz, in particular slag, in particular having a particle size of 0.1 to 16 mm, preferably 0.11 to 8 mm, in particular 0.12 to 4 mm,
10% to 30% by weight of additional filler material, in particular having a particle size of not more than 0.1 mm, in particular about 0.1 µm to 0.1 mm,
0% to 2% by weight, in particular 0.01% to 1.5% by weight, of additives comprising at least one wetting agent or dispersant, in particular a polycarboxylate ether, and
0% to 5% by weight of an organic solvent, in particular a solvent in which the polycarboxylate ether is soluble.

A further preferred composition of the solid component comprises:
93% to 100% by weight, preferably 95% to 99.97% by weight, of slag and/or quartz, in particular slag, in particular having a particle size of about 0.1 µm to 16 mm, preferably about 0.1 µm to 8 mm, in particular about 0.1 µm to 4 mm,
0% to 1.5% by weight, preferably 0.01% to 1% by weight, of a polycarboxylate ether, and
0% to 5% by weight, preferably 0.02% to 4% by weight, of an organic solvent in which the polycarboxylate ether is soluble.

The grain size/particle size can be determined by a sieving method in accordance with DIN EN 933-1.

The invention further provides for the use of the binder composition, or of the multicomponent system, for the bonding, coating or sealing of substrates, for the filling of edges, holes or joints, as anchoring or injection resin, as a grouting or casting compound, as a floor covering, as a grouting mortar and/or for production of moldings.

In particular, the binder composition or the multicomponent system is used as a grouting mortar.

A "grouting mortar" is characterized in particular by relatively high flowability. In particular, the grouting mortar is self-leveling. This means that the grouting mortar flows quickly and without demixing, purely due to gravity, and forms a horizontal surface on top. As a measure of flowability, the $t_{500}$ time according to DIN EN 12350-8:2010-12 ("Testing fresh concrete—Part 8: Self-compacting concrete—Slump-flow test") can for example be applied accordingly.

It has been found to be possible, on the basis of the binder composition of the invention based on an organic binder, to formulate grouting mortars that have a flowability comparable to cement-based grouting mortars. The grouting mortars of the invention can thus be used for example as a substitute for cement-based grouting mortars.

The grouting mortar particularly preferably has the following properties: (i) the grain size is not more than 4 and/or (ii) the compressive strength after 7 days at 20° C. is greater than 40 MPa (measured in accordance with ASTM D695-

96). The grouting mortar very particularly preferably meets the provisions of the EN 1504-6:2006 standard.

The invention further relates to the use of the binder composition, or of the multicomponent system, for the production of polymer concretes and/or grouting mortars that have improved stability towards corrosive substances, in particular acidic and/or basic aqueous solutions. The improved stability is preferably improved in relation to acidic, to neutral and to basic aqueous solutions.

An acidic solution is here understood as meaning in particular a solution having a pH of <7, preferably of <4. A basic solution means in particular a solution having a pH of >7, preferably of >10.

"Improved stability" is understood here in particular as meaning that the compressive strength of the polymer concrete or of the grouting mortar after curing for 7 days at 20° C., followed by storage at 20° C. for 21 days in an aqueous 10% by volume solution of acetic acid, a neutral aqueous solution and/or an aqueous 50% by weight solution of NaOH and subsequent drying to constant weight, decreases by less than 10%, in particular less than 5%, preferably less than 1%. The compressive strength is preferably determined in accordance with the ASTM D695 standard.

The filler in the binder composition or in the multicomponent system is here preferably slag, in particular iron-containing slag.

A proportion of slag is here in particular at least 60% by weight, preferably at least 65% by weight, based on 100% by weight of the binder composition.

The binder composition even more preferably comprises slag having a particle size greater than 0.1 mm and additional filler material that is not a slag and has a particle size of not more than 0.1 mm and no further filler materials.

The binder composition or the multicomponent system are therefore particularly suitable for uses in which they come into contact with corrosive substances, in particular acidic and/or basic aqueous solutions.

Another aspect of the invention therefore relates to the use of the binder composition, or of the multicomponent system, for uses in which the binder composition, or the multicomponent system, after curing comes into contact with corrosive substances, in particular acidic and/or basic aqueous solutions.

These are preferably uses in which the binder composition, or the multicomponent system, after curing comes into contact with both acidic and basic aqueous solutions.

Another aspect of the present invention relates to the use of the cured binder composition, or of a cured multicomponent system, for conducting electric current, in particular for dissipating electrostatic charges and/or for balancing the electric potential between two bodies.

The invention further provides for the use of the binder composition of the invention, or of the multicomponent system of the invention, for the production of materials having improved electrical conductivity at 20° C., characterized in that the slag in the binder composition is an iron-containing slag comprising at least 8% by weight of iron, calculated as FeO, based on the total weight of the slag, and/or a slag having a bulk density of at least 3.1 kg/l.

A cured binder composition of this kind surprisingly shows improved electrical conductivity compared to a cured binder composition that, instead of the iron-containing slag, comprises the same amount by weight of quartz sand having the same grading curve.

The material with improved electrical conductivity preferably has a specific electrical volume resistance that is reduced by a factor of at least 2, more preferably at least 2.5, in particular at least 3.0, compared to an material that is otherwise identical except for containing quartz sand of the same particle size instead of the iron-containing slag. Electrical volume resistance is determined at 20° C. between the two opposite 40×40 mm surfaces of a prism of 40×40×160 mm by applying a voltage of 100 mV and a frequency of 1 kHz, the measurement being performed after storage for 7 days at 20° C.

Curable binder compositions comprising slags having a bulk density of at least 2.9 kg/l, in particular at least 3.1 kg/l, preferably at least 3.3 kg/l, especially at least 3.5 kg/l, are particularly advantageous for the grouting of machines. This makes it possible to obtain an especially good bond between the cured binder composition and the overlying machine or turbine that has been grouted, as well as good compressive strength in the grouting material.

The multicomponent system is used by mixing the components. This is advantageously done by first thoroughly mixing the at least two components comprising the constituents of the organic binder and then thoroughly mixing in the component comprising the filler, in particular slag, if there is such a separate component. Further components or additives may also be added. Once all the components have been mixed, curing takes place. Such processing is known to the person skilled in the art.

The freshly mixed curable binder composition can surprisingly be processed very easily and homogeneously at ambient temperatures despite the high proportion of filler, in particular slag.

It can also be advantageous, in particular for use of the binder composition of the invention as leveling mortar, screed or floor coating, when a binder composition of the invention is mixed and applied in the following steps:
  mixing all the components of the binder composition, except for fillers having a particle size greater than 0.06 mm, using suitable mixing devices,
  applying the mixture as leveling mortar, screed or floor coating, and
  sprinkling with fillers having a particle size greater than 0.06 mm, wherein at least 20% by weight of these fillers is iron-containing slag, manually or using a suitable device.

The invention further provides a cured binder composition obtained by curing the curable binder composition of the invention or by mixing the components and curing the multicomponent system of the invention.

Curing preferably takes place at ambient temperatures, in particular at a temperature within a range from 5 to 40° C., in particular 7 to 35° C.

The binder composition is cured when there are no longer any significant reactions between isocyanate groups and the hydroxyl groups of the polyol. The cured binder composition has a solid consistency. In particular, it can be in the form of a three-dimensional object or component, or of a coating, bonding layer, spackling compound, constituent of a laminate, adhesive, filling or seal.

The filler, in particular slag, and the filler material, if present, are preferably dispersed uniformly or essentially uniformly in the cured binder composition.

However, it can also be advantageous, in particular for underfilling, for example of machines and turbines, when the concentration of filler, in particular slag, in the topmost layer of the horizontal surface of the cured binder composition is lower than in the rest of the cured binder composition, in particular less than 10% by weight. This can improve the bond between the binder composition and the object to be underfilled.

EXAMPLES

Working examples are presented hereinbelow, the purpose of which is to further elucidate the described invention. The invention is of course not limited to these described working examples.

"Ex." stands for "example".

"Ref." stands for "reference example".

Materials Used

Setathane® 1150 is a polyol based on a reaction product of castor oil with ketone resins (Allnex Resins Germany GmbH, Germany).

Desmophen® T4011 is a polyether polyol based on 1,1,1-trimethylolpropane (Covestro AG, Germany).

Sylosiv® is a zeolite (Grace, USA).

Desmodur® VL is an aromatic polyisocyanate based on diphenylmethane 4,4′ diisocyanate (Covestro AG, Germany).

Desmodur® CD-L is an aromatic polyisocyanate based on diphenylmethane 4,4′ diisocyanate (Covestro AG, Germany).

Neukapol® 1119 is a reaction product of epoxidized vegetable oils (rapeseed oil) having a proportion of unsaturated $C_{18}$ fatty acids of 91% by weight, based on the total amount of fatty acids, with monofunctional $C_1$ to $C_{18}$ alcohols; OH functionality 2.0, average molecular weight approx. 390 g/mol, OH value of 290 mg KOH/g (Altropol Kunststoff GmbH, Germany).

Neukapol® 1582 is a reaction product of epoxidized fatty acid esters of methanol with glycerol, where the epoxidized fatty acid esters, as fatty acid component, are based on fatty acid mixtures of rapeseed oil or sunflower oil, in a mixture with N,N,N′,N′-tetrakis(2-hydroxypropyl)ethylenediamine (Altropol Kunststoff GmbH, Germany).

The quartz sand and slags were dried before use and divided into grain fractions by sieving. The grain fractions were then mixed such that the grain size distribution of the sands used corresponded to a specified grain size distribution (grading curve).

EFS is an electric furnace slag from Stahl Gerlafingen, Switzerland. The material used had a bulk density of around 3.3 kg/l and an iron content, calculated as FeO, of about 19% by weight.

BFS is a blast furnace slag from Hüttenwerke Krupp Mannesmann, Germany, available from Hermann Rauen GmbH & Co., Germany. The material used had a bulk density of 2.9 kg/l and an iron content, calculated as FeO, of about 3% by weight.

Raulit® is a blast furnace slag from DK-Recycling and Roheisen GmbH, Germany, available under the brand name Raulit®-Mineralbaustoffgemisch from Hermann Rauen GmbH & Co., Germany. The material used had a bulk density of around 2.9 kg/l and an iron content, calculated as FeO, of about 1% by weight.

FS is a foundry sand from voestalpine AG, Austria. The material used had a bulk density of around 2.9 kg/l and an iron content, calculated as FeO, of less than 1% by weight.

CS is NAstra® iron silicate granules, a glassy copper slag available from Sibelco, Germany, having a bulk density of about 3.7 kg/l and an iron content, calculated as FeO, of about 51% by weight.

Sikadur®-42 HE is a three-component epoxy-resin-based grouting mortar available from Sika Schweiz AG.

The polycarboxylate ether was a comb polymer with carboxylic acid groups and polyethylene glycol side chains.

Measurement Methods

Compressive strength and flexural strength were determined on 40×40×160 mm test specimens using testing machines in accordance with DIN EN 196-1 and EN 12190.

For determination of specific electrical volume resistance, the opposite 40×40 mm surfaces of the 40×40×160 mm test specimens were coated with electrically conductive gel and a steel electrode covering the entire surface was placed flush on both surfaces. The electrical volume resistance of the test specimens was determined by applying a voltage of 100 mV AC at a frequency of 1 kHz and 10 kHz to the two electrodes.

Thermal conductivity was determined in accordance with ASTM D5470-06 using the ZFW TIM tester from ZFW (Center for Thermal Management) Stuttgart, Germany, on test specimens 30 mm in diameter and 2 mm in height.

Polyurethane Matrix

For the examples, the polyol components (component A) and polyisocyanate components (component B) described in Tables 1 and 2 were used as the polyurethane matrix.

For each composition, the ingredients specified in Tables 1 and 2 were processed in the specified amounts (in parts by weight) of the polyol component A, by means of a vacuum dissolver with exclusion of moisture, to give a homogeneous paste and stored. The ingredients of the polyisocyanate component B specified in Tables 1 and 2 were likewise stored.

TABLE 1

Compositions of the polyurethane matrices (all figures except ratios in % by weight)

|  | A | B | C | D | E | F |
|---|---|---|---|---|---|---|
| Component A |  |  |  |  |  |  |
| Setathane ® 1150 | 65.6 | 65.6 | 59.7 | 59.7 | 55.3 | 55.3 |
| Desmophen ® T4011 | 4.3 | 4.3 | 3.7 | 3.7 | 3.5 | 3.5 |
| Hydroxy-terminated polybutadiene polyol | 19.0 | 19.0 | 18.7 | 18.7 | 17.3 | 17.3 |

TABLE 1-continued

Compositions of the polyurethane matrices (all figures except ratios in % by weight)

|  | A | B | C | D | E | F |
|---|---|---|---|---|---|---|
| Chain extender | | | | | | |
| Butane-1,4-diol | 4.3 | 4.3 | — | — | — | — |
| Pentane-1,5-diol | — | — | 11.2 | 11.2 | — | — |
| Ethylhexane-1,3-diol | — | — | — | — | 13.8 | 13.8 |
| Sylosiv ® | 6.9 | 6.9 | 6.6 | 6.6 | 10.0 | 10.0 |
| Process chemicals[1)] | 0.1 | 0.1 | 0.1 | 0.1 | 0.1 | 0.1 |
| Component B | | | | | | |
| Desmodur ® VL[6)] | 100 | — | 100 | — | 100 | — |
| Desmodur ® CD-L[7)] | — | 100 | — | 100 | — | 100 |
| Mixing ratio A:B [wt %/wt %] | 100:49.4 | 100:52.9 | 100:65.1 | 100:69.7 | 100:57.5 | 100:61.6 |
| NCO:OH | 1.11 | 1.11 | 1.11 | 1.11 | 1.10 | 1.10 |

[1)]Defoamer and catalyst

TABLE 2

Compositions of the polyurethane matrices (all figures except ratios in % by weight)

|  | G | H | I | J |
|---|---|---|---|---|
| Component A | | | | |
| Neukapol ® 1119 | 43.9 | 43.9 | 58.0 | 58.0 |
| Neukapol ® 1582 | 22.0 | 22.0 | 29.0 | 29.0 |
| Hydroxy-terminated polybutadiene polyol | 22.0 | 22.0 | — | — |
| Sylosiv ® | 12.0 | 12.0 | 12.8 | 12.8 |
| Process chemicals[1)] | 0.1 | 0.1 | 0.1 | 0.1 |
| Component B | | | | |
| Desmodur ® VL | 100 | — | 100 | — |
| Desmodur ® CD-L | — | 100 | — | 100 |
| Mixing ratio A:B [wt %/wt %] | 100:64.6 | 100:69.2 | 100:81.9 | 100:87.8 |
| NCO:OH | 1.07 | 1.07 | 1.07 | 1.07 |

[1)]Defoamer and catalyst

Solid Component

For production of the solid component, the solid constituents listed in Table 3 were mixed dry, during which a polycarboxylate ether solution was applied by spraying.

TABLE 3

Composition of the solid component

| Constituent | Proportion [wt %] |
|---|---|
| Mixture of limestone powder and baryte powder, <0.1 mm | 25.2 |
| Sand (slag sand or quartz sand)*, 0.12-3.2 mm | 74.3 |
| Polycarboxylate ether solution (20% by weight of polycarboxylate ether dissolved in 80% by weight of benzyl alcohol) | 0.5 |

*Sand type: See examples.

Production of Curable Grouting Mortars and Test Specimens

The polyol components A and polyisocyanate components B from Tables 1 and 2 were processed into a homogeneous paste for 30 seconds using a SpeedMixer® (DAC 150 FV, Hauschild; for mixing ratios see Tables 1 and 2). A solid component as per Table 3 was then added and mixed in thoroughly. Unless otherwise stated, the solid component had a constant proportion of 89.5% by weight, while the mixed polyol components A and polyisocyanate components B together had a proportion of 10.5% by weight.

For comparison purposes, curable compositions and test specimens based on an epoxy resin matrix (hereinafter referred to as SD) were produced as follows: Sikadur®-42 HE component A (comprising the epoxy resin) was mixed thoroughly with the associated component B (comprising the curing agent) in a weight ratio of 3:1 and then a self-produced solid component as per Table 3 was added and mixed in thoroughly. Unless otherwise stated, the solid component had a constant proportion of 89.5% by weight, while the mixed epoxy resin and curable components together had a proportion of 10.5% by weight.

To produce the test specimens, the mixed curable compositions were poured into steel molds and stored in the formwork for 24 hours at 20° C. The test specimens were then removed from the formwork and stored further at 20° C. After 7 days of storage, the specific electrical resistance, strength, and thermal conductivity were determined.

Strength and Electrical Volume Resistance of Grouting Mortars

The strengths and electrical volume resistances of various grouting mortars are stated in the tables below.

The "Binder matrix" row indicates the polyurethane matrix/epoxy resin matrix used (see Tables 1 and 2), while the "Sand" row indicates the type of sand or slag used in the solid component (see Table 3).

TABLE 4

Results when using quartz and Desmodur ® VL as polyisocyanate component in the polyurethane matrix

| | Ref. 1 | B1 | B2 | B3 | B4 | B5 |
|---|---|---|---|---|---|---|
| Binder matrix | SD | I | G | E | C | A |
| Sand | Quartz sand | Quartz sand | Quartz sand | Quartz sand | Quartz sand | Quartz sand |
| Compressive strength [MPa] | 104 | 99 | 71 | 74 | 82 | 64 |
| Flexural strength [MPa] | 26 | 26 | 22 | 24 | 25 | 24 |
| Specific electrical volume resistance [MΩ · cm] at 1 kHz | 243.0 | 21.4 | 23.3 | 24.0 | 24.5 | 24.6 |
| Factor[1] 1 kHz | | 0.09 | 0.10 | 0.10 | 0.10 | 0.10 |
| Specific electrical volume resistance [MΩ · cm] at 10 kHz | 24.9 | 2.2 | 2.4 | 2.5 | 2.5 | 2.5 |
| Factor 10 kHz | | 0.09 | 0.10 | 0.10 | 0.10 | 0.10 |

[1] Factor by which the specific electrical volume resistance of a mortar as per examples B1 to B5 is reduced compared to the specific electrical volume resistance of reference mortar Ref. 1, e.g. resistance B1/resistance Ref. 1

TABLE 5

Results when using quartz and Desmodur ® CD-L as polyisocyanate component in the polyurethane matrix

| | Ref. 1 | B6 | B7 | B8 | B9 | B10 |
|---|---|---|---|---|---|---|
| Binder matrix | SD | J | H | F | D | B |
| Sand | Quartz sand | Quartz sand | Quartz sand | Quartz sand | Quartz sand | Quartz sand |
| Compressive strength [MPa] | 104 | 102 | 75 | 75 | 82 | 73 |
| Flexural strength [MPa] | 26 | 27 | 23 | 24 | 26 | 27 |
| Specific electrical volume resistance [MΩ · cm] at 1 kHz | 243.0 | 26.0 | 23.3 | 24.5 | 25.9 | 23.6 |
| Factor[1] 1 kHz | | 0.11 | 0.10 | 0.10 | 0.11 | 0.11 |
| Specific electrical volume resistance [MΩ · cm] at 10 kHz | 24.9 | 2.7 | 2.4 | 2.5 | 2.7 | 2.4 |
| Factor 10 kHz | | 0.11 | 0.10 | 0.10 | 0.11 | 0.10 |

From the data in Tables 4 and 5, it can be seen that the electrical conductivity increases by an order of magnitude and the specific electrical resistance decreases by an order of magnitude when switching from an epoxy matrix to a polyurethane matrix with the filler unchanged. Specifically, the specific electrical volume resistance in example Ref. 1 (based on epoxy matrix SD and quartz as filler) is 243.0 MΩ·cm at 1 kHz or 24.9 MΩ·cm at 10 kHz, whereas the corresponding volume resistances for examples B1-1310 (all based on a polyurethane matrix and quartz as filler) are max. 26.0 MΩ·cm at 1 kHz and 2.7 MΩ·cm at 10 kHz.

TABLE 6

Results when using copper slag (CS) and Desmodur ® VL as polyisocyanate component in the polyurethane matrix

| | Ref. 2 | B11 | B12 | B13 | B14 | B15 |
|---|---|---|---|---|---|---|
| Binder matrix | SD | I | G | E | C | A |
| Sand | CS | CS | CS | CS | CS | CS |
| Compressive strength [MPa] | 116 | 93 | 66 | 65 | 82 | 51 |
| Flexural strength [MPa] | 31 | 26 | 20 | 23 | 29 | 21 |
| Specific electrical volume resistance [MΩ · cm] at 1 kHz | 24.9 | 15.5 | 15.3 | 16.7 | 15.5 | 15.8 |
| Factor[1] 1 kHz | | 0.62 | 0.61 | 0.67 | 0.62 | 0.63 |
| Specific electrical volume resistance [MΩ · cm] at 10 kHz | 3.3 | 1.6 | 1.6 | 1.8 | 1.6 | 1.7 |
| Factor 10 kHz | | 0.48 | 0.48 | 0.55 | 0.48 | 0.52 |

TABLE 7

Results when using copper slag (CS) and Desmodur ® CD-L as polyisocyanate component in the polyurethane matrix

|  | Ref. 2 | B16 | B17 | B18 | B19 | B20 |
|---|---|---|---|---|---|---|
| Binder matrix | SD | J | H | F | D | B |
| Sand | CS | CS | CS | CS | CS | CS |
| Compressive strength [MPa] | 116 | 95 | 68 | 67 | 69 | 63 |
| Flexural strength [MPa] | 31 | 27 | 20 | 20 | 25 | 25 |
| Specific electrical volume resistance [MΩ · cm] at 1 kHz | 24.9 | 15.8 | 16.1 | 16.3 | 15.5 | 16.1 |
| Factor[1)] 1 kHz |  | 0.63 | 0.65 | 0.65 | 0.62 | 0.65 |
| Specific electrical volume resistance [MΩ · cm] at 10 kHz | 3.3 | 1.7 | 1.7 | 1.7 | 1.7 | 1.7 |
| Factor 10 kHz |  | 0.52 | 0.52 | 0.52 | 0.52 | 0.52 |

Even when using iron-containing slag, the examples based on a polyurethane matrix (examples B11-620) show markedly lower specific electrical volume resistances at both 1 kHz and 10 kHz compared to an epoxy-based composition (example Ref. 2).

A comparison of Tables 4/5 with Tables 6/7 moreover shows that the use of iron-containing slag instead of quartz is able to further reduce the specific electrical volume resistances by a factor of 2-3.

Thermal Conductivity

The thermal conductivities of various grouting mortars were also measured. This was done by producing test specimens having a diameter of 30 mm and a height of 2 mm by pouring into appropriate molds and allowing them to cure at 20° C. for 7 days.

TABLE 8

Results for thermal conductivities

|  | Ref. 3 | B21 | B22 | B23 | B24 | B25 | B26 |
|---|---|---|---|---|---|---|---|
| Binder matrix | SD | I | I | I | I | I | I |
| Sand | Quartz sand | BFS | Raulit | FS | EFS | CS |
| Thermal conductivity [W/mK]] | 2.8 | 2.9 | 1.1 | 1.1 | 0.9 | 1.0 | 0.9 |

By using slag instead of quartz, the thermal conductivity can be markedly reduced.

Corrosion Resistance

To test the corrosion resistance of the binder compositions and of test specimens produced therefrom, various test specimens were produced as described above and allowed to cure for 7 days at 20° C. Compressive strength was then determined in accordance with ASTM D695.

Thereafter, the test specimens were each stored for 21 days (21 d) in pure water ($H_2O$), in 10% by volume acetic acid (AcOH) or in 50% by weight sodium hydroxide solution (NaOH) and then dried to constant weight. Compressive strength was then determined again in accordance with ASTM D695.

Figure 2:
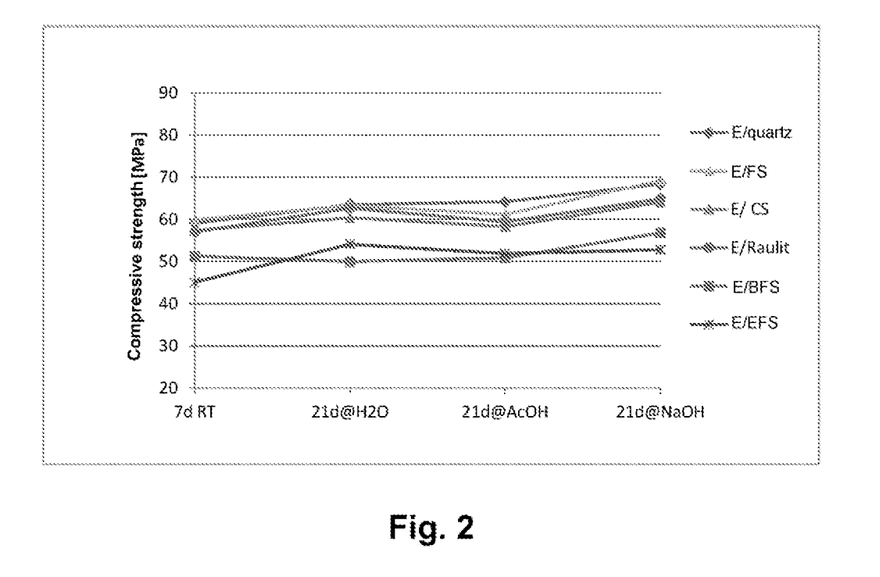
FIG. 2 shows: the compressive strengths of inventive test specimens having a polyurethane matrix and different fillers after storage in different media ($H_2O$, AcOH or NaOH)

FIG. 2 shows the compressive strengths of test specimens based on polyurethane matrix E and a solid component as described above, with quartz, FS, CS, Raulit, BFS, and EFS alternately used as sand.

It can be seen here that compressive strengths, irrespective of which medium is used ($H_2O$, AcOH or NaOH), are not only unimpaired but increase during storage.

Figure 3:
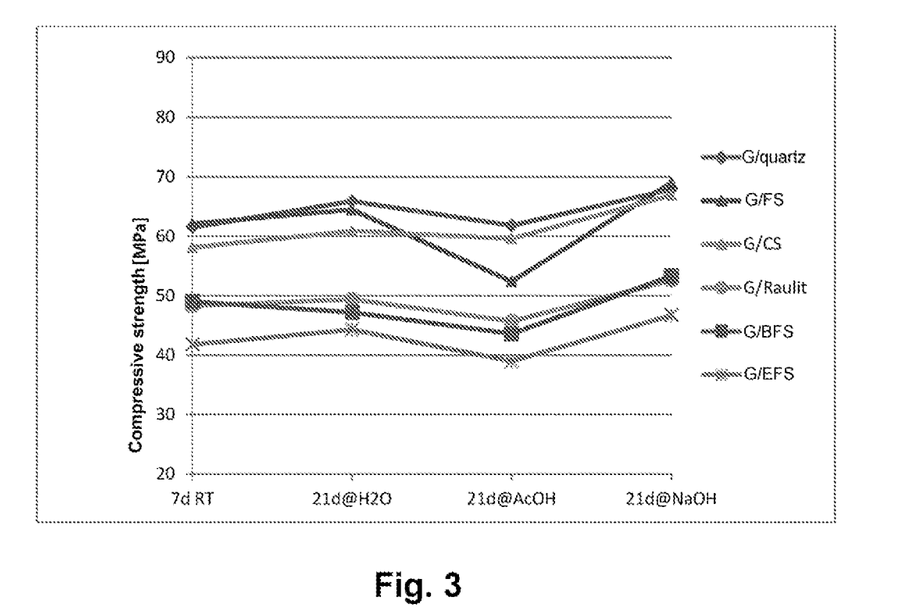
FIG. 3 shows: the compressive strengths of further inventive test specimens having a polyurethane matrix and different fillers after storage in different media.

FIG. 3 shows the compressive strengths of test specimens based on polyurethane matrix G and a solid component as described above, with quartz, FS, CS, Raulit, BFS, and EFS alternately used as sand.

In this case too, compressive strengths increase after storage in $H_2O$ and NaOH, whereas in AcOH a slight decrease is discernible for certain solid components.

Figure 4:
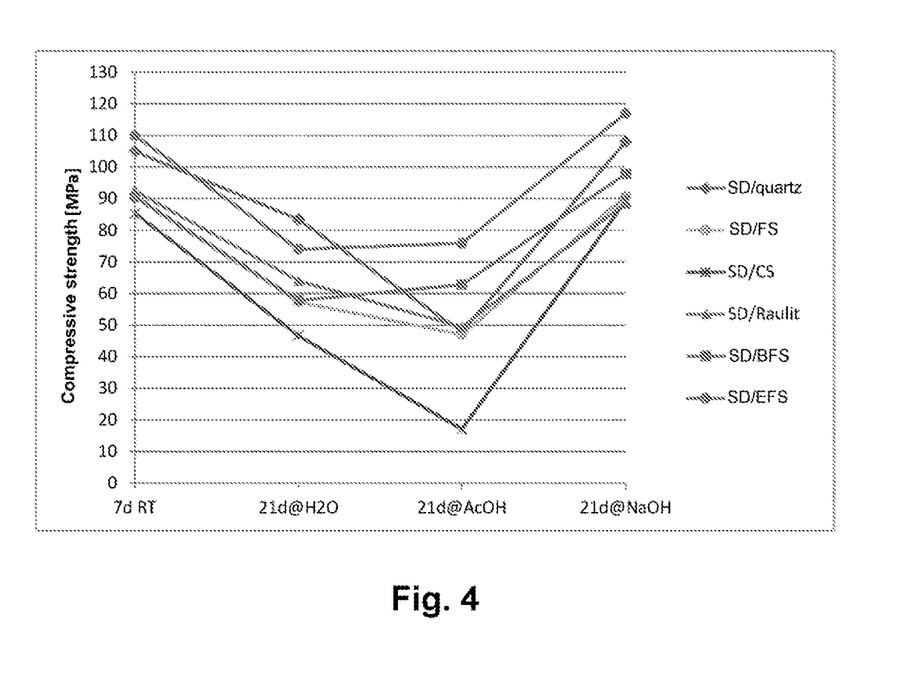
FIG. 4 shows: the compressive strengths of epoxy-based test specimens having different fillers after storage in different media.

FIG. 4 shows for comparison the results for test specimens based on epoxy resin matrix SD and a solid component as described above, with quartz, FS, CS, Raulit, BFS, and EFS again alternately used as sand.

This shows clearly the sharp decrease in compressive strength on storage in $H_2O$ and AcOH. Only in NaOH is compressive strength maintained, or increases slightly during storage.

Grouting Mortars with Different Amounts of Polyurethane Matrix

Table 9 shows the compositions and compressive strengths of further grouting mortars in which the amounts of the binder matrix and the solid components were modified.

TABLE 9

Grouting mortars with different amounts of sand and polyurethane matrix

|  | B27 | B28 | B29 | B30 | B31 | B32 |
|---|---|---|---|---|---|---|
| Binder matrix/ Proportion [wt %] | E 6.0 | E 6.0 | E 20.0 | E 20.0 | E 12.5 | E 12.5 |
| Slag/ Proportion [wt %] | CS 79.9 | EFS 79.9 | CS 66.9 | EFS 66.9 | CS 75.4 | EFS 75.4 |
| Mixture of limestone powder and baryte powder [wt %] | 14.0 | 14.0 | 13.0 | 13.0 | 12.0 | 12.0 |
| Polycarboxylate ether solution [wt %] | 0.1 | 0.1 | 0.1 | 0.1 | 0.1 | 0.1 |
| Compressive strength [MPa] | 36.6 | 18.3 | 40.7 | 31.9 | 55.0 | 33.8 |

The results in Table 9 show that a proportion of binder matrix in the region of more than 6.0% by weight is advantageous in respect of compressive strength. In the case of copper slag (CS) and electric furnace slag (EFS), the test with 12.5% by weight of binder matrix shows the highest compressive strength.

The invention claimed is:

1. A curable binder composition comprising:
   a) at least one organic binder comprising a polyisocyanate and a polyol, and
   b) a filler in the form of slag or a mixture of slag and quartz, wherein:
   slag is present in an amount of at least 60% by weight, based on 100% by weight of the binder composition, and
   the slag is an iron-containing slag comprising at least 8% by weight of iron, calculated as FeO, and the slag has a bulk density of at least 2.9 kg/l.

2. The binder composition as claimed in claim 1, wherein the filler has a particle size of at least 0.1 mm.

3. The binder composition as claimed in claim 1, wherein the slag is selected from the group consisting of blast furnace slags.

4. The binder composition as claimed in claim 1, wherein the binder composition further comprises an additional filler material different from the filler.

5. The binder composition as claimed in claim 1, wherein the composition comprises less than 10% by weight of quartz.

6. The binder composition as claimed in claim 1, wherein the polyisocyanate and the polyol together are present in the binder composition in an amount of at least 5% by weight based on 100% by weight of the binder composition.

7. The binder composition as claimed in claim 1, wherein the organic binder includes at least one mixture of polyols having different OH functionality.

8. The binder composition as claimed in claim 1, comprising:
   3% to 40% by weight of polyisocyanates,
   3% to 40% by weight of polyols,
   60% to 94% by weight of filler in the form of slag,
   optionally 10% to 40% by weight of additional filler material, and
   0% to 15% by weight of further additives,
   based on 100% by weight of the binder composition.

9. A multicomponent system for producing the curable binder composition according to claim 1, the multicomponent system comprising:
   at least one polyisocyanate component comprising the polyisocyanate,
   at least one polyol component comprising the polyol,
   the filler, and
   optionally further ingredients,
   wherein the filler and the optional further ingredients are present in the at least one polyisocyanate component, in the at least one polyol component, and/or in any further component optionally present.

10. A cured binder composition obtained by mixing the at least one polyisocyanate component, the at least one polyol component, the filler, and the optional further ingredients of the multicomponent system according to claim 9 and curing the multicomponent system.

11. A polymer concrete or grouting mortar comprising the binder composition as claimed in claim 1.

12. The binder composition as claimed in claim 1, wherein the binder composition conducts electric current.

13. A material comprising the binder composition as claimed in claim 1, wherein the material has improved electrical conductivity at 20° C. as compared to a like material without the binder composition.

14. The material according to claim 13, wherein the slag has a bulk density of at least 3.1 kg/l.

15. A cured binder composition obtained by curing the binder composition according to claim 1.

* * * * *